United States Patent [19]

Beyerlein et al.

[11] Patent Number: 5,504,668

[45] Date of Patent: Apr. 2, 1996

[54] FREQUENCY CONTROLLED RESONANT INVERTER

[75] Inventors: Walter Beyerlein, Bubenreuth; Norbert Blank, Erlangen, both of Germany

[73] Assignee: Siemens Aktiengesellschaft, Munich, Germany

[21] Appl. No.: 239,385

[22] Filed: May 6, 1994

[30] Foreign Application Priority Data

Oct. 11, 1993 [DE] Germany .................. 43 34 592.1

[51] Int. Cl.⁶ .................................................. H02M 7/44
[52] U.S. Cl. .................. 363/95; 363/98; 363/15; 363/17; 363/132
[58] Field of Search .................. 363/15, 17, 40, 363/95, 96, 97, 98, 131, 132, 135, 136

[56] References Cited

U.S. PATENT DOCUMENTS

| | | | |
|---|---|---|---|
| 4,410,936 | 10/1983 | Suzuki | 363/97 |
| 4,653,082 | 3/1987 | Tsuchiya | 363/132 |
| 4,679,129 | 7/1987 | Sakakibara et al. | 363/98 |
| 4,694,383 | 9/1987 | Nguyen et al. | 363/98 |
| 4,706,180 | 11/1987 | Wills | 363/98 |
| 5,057,698 | 10/1991 | Widener et al. | 363/98 |
| 5,062,031 | 10/1991 | Flachenecker et al. | 363/97 |
| 5,075,836 | 12/1991 | Suzuki et al. | 363/98 |
| 5,107,412 | 4/1992 | Fuchs | 363/96 |
| 5,121,317 | 6/1992 | Vogler | 363/96 |
| 5,208,738 | 5/1993 | Jain | 363/98 |

FOREIGN PATENT DOCUMENTS 0231756  8/1987  European Pat. Off. ....... H02M 3/337

OTHER PUBLICATIONS

"Series Resonant Converter with Third–Order Communication Network", Liu et al, IEEE Transactions on Power Electronics, vol. 7, No. 3, Jul. 1992, pp. 462–468.

Primary Examiner—Jeffrey L. Sterrett
Attorney, Agent, or Firm—Hill, Steadman & Simpson

[57] ABSTRACT

A high-frequency high-voltage generator is provided for x-ray technology that automatically adapts to all load instances and to the coupling network. The inverter is driven dependent on the zero-axis crossing in a series resonant circuit. The capacitor of this series resonant circuit is bridged by an inductance, forming a parallel branch and the control signal for the inverter is acquired from the time delay between the zero-axis crossings in the series resonant circuit in the parallel branch.

1 Claim, 3 Drawing Sheets

5,504,668

FREQUENCY CONTROLLED RESONANT INVERTER

BACKGROUND OF THE INVENTION

1. Field of the Invention

The present invention is directed to a high-frequency generator of the type having, in sequence, a DC source, an inverter, an LC resonant circuit, and a transformer connectable to a load.

2. Description of the Prior Art

A high-frequency generator of the type described above is disclosed in European Application 0 231 756 and is described in the periodical IEEE Transactions on Power Electronics, Vol. 7, No. 3, July 1992, pages 462–468. The load can be an x-ray tube. The generator is also suitable for feeding other high-voltage users (for example, lasers, radar tubes, dust filters).

The inverter has the task of converting a DC voltage acquired from the mains into a high-frequency AC voltage which can then be upwardly transformed. Further, the inverter is an actuator for controlling the load voltage. To that end, the load is coupled to the inverter via a series resonant circuit. The control is accomplished by varying the drive frequency of the inverter in relationship to the resonant frequency of the resonant circuit.

This known technique is selected because of the following advantages:

Independent decay of the resonant current.

Advantages because of the sinusoidal current with respect to electromagnetic compatibility and lower component load (high-voltage diodes).

Low switching losses of the power switches.

These are opposed by the following disadvantages, since the load range of the x-ray tube usually amounts to 0.1 mA through 1 A and 40 kV through 150 kV:

Extremely large range of variation of the drive frequency, approximately 1:10,000 (for example 2 Hz to 20 kHz).

The high-voltage transformer must be designed for an extremely wide frequency range.

The ripple of the high-voltage increases with decreasing drive frequency.

The ratio of loac current to transformer losses becomes less beneficial with decreasing frequency.

The working range lies primarily in the audible range.

These disadvantages could previously be avoided only by a pre-regulating the supply voltage of the inverter. This involves substantial outlay:

Power chokes, active components (thyristors), ignition stages, regulation, increased outlay for the filtering of the inverter supply voltage.

For controlling the power, the drive frequency of the, inverter can be varied in relationship to the resonant frequency of the coupling network. A voltage/frequency converter can be utilized for the power control. This serves the purpose of converting the regulator output voltage (manipulated variable) into a drive frequency.

Various problems, however, in conjunction with this approach arise. The resonant circuit frequency varies greatly given large changes in load current as occur given employment in x-ray technology. This results in the necessity of matching the pulse width of the voltage/frequency converter to the operating point. Further, the resonant frequencies are affected by tolerances in the resonant circuit (LC) components. In order to guarantee a monotone characteristic of the inverter, a compensation would therefore have to be implemented which assures that an upward transgression of the maximum, or a downward transgression of the minimum, is precluded.

European Application 0 448 165 discloses a high-frequency generator having a series resonant circuit/inverter for feeding an x-ray tube, whereby the zero axis crossings of the current are acquired in the series resonant circuit, so that operation is not interrupted even given low forward swing currents.

SUMMARY OF THE INVENTION

An object of the present invention is to fashion a high-frequency generator of the type initially cited such that the aforementioned disadvantages are avoided, and whereby an automatic matching to all load instances ensues.

The above object is achieved in accordance with the principles of the present invention in a high-frequency generator having a DC voltage source, an inverter connected to the DC voltage source, a transformer, and an LC series resonant circuit connected between the output of the inverter and the transformer, and including an additional inductance connected in parallel with the capacitor of the resonant circuit. Sensors are provided for measuring the respective currents in parallel branch and in the series resonant circuit. The respective zero-axis crossings of these currents are identified, and the switching times of the switches of the inverter are controlled by means of a control voltage, which is formulated based on the zero-axis crossings, the switching times being made inversely proportional to the time delay between the respective zero axis crossings of the current in the parallel branch and the current in the series resonant circuit.

DESCRIPTION OF THE PREFERRED EMBODIMENTS

Figure 1:
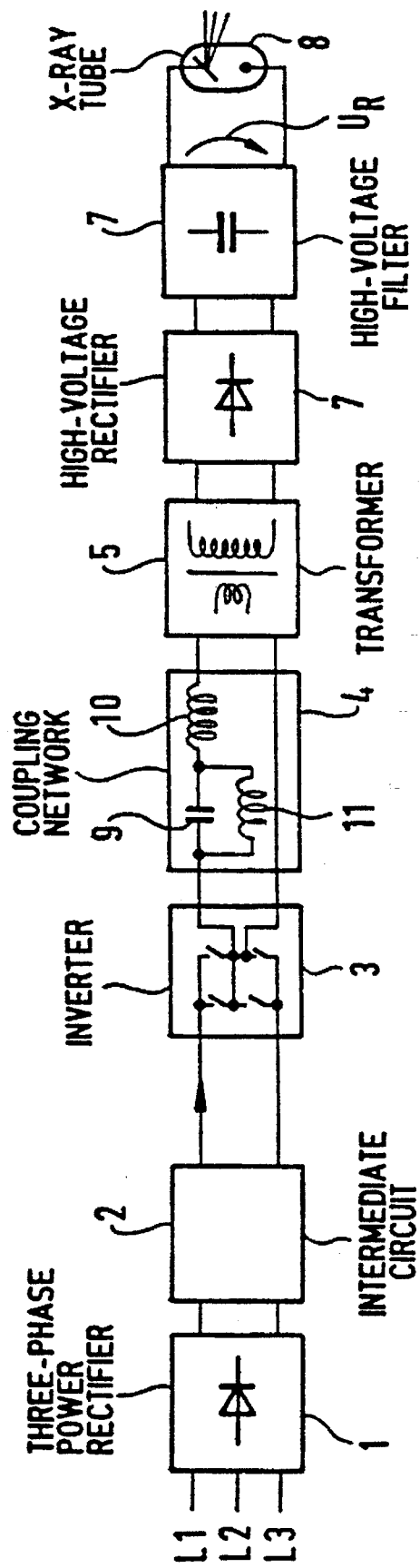
FIG. 1 shows a block circuit diagram of a high-frequency x-ray generator for explaining the idea of the invention.

FIG. 1 shows a three-phase power rectifier 1 which is followed by an intermediate circuit 2, an inverter- 3, a coupling network 4, a high-voltage transformer 5, a high-voltage rectifier 6, a high-voltage filter element 7, and an x-ray tube 8 as the load.

The coupling network 4 contains an LC series resonant circuit formed by a capacitor 9 and an inductance 10. The capacitor 9 of this LC series resonant circuit has an inductance 11 connected in parallel with it.

Figure 2:
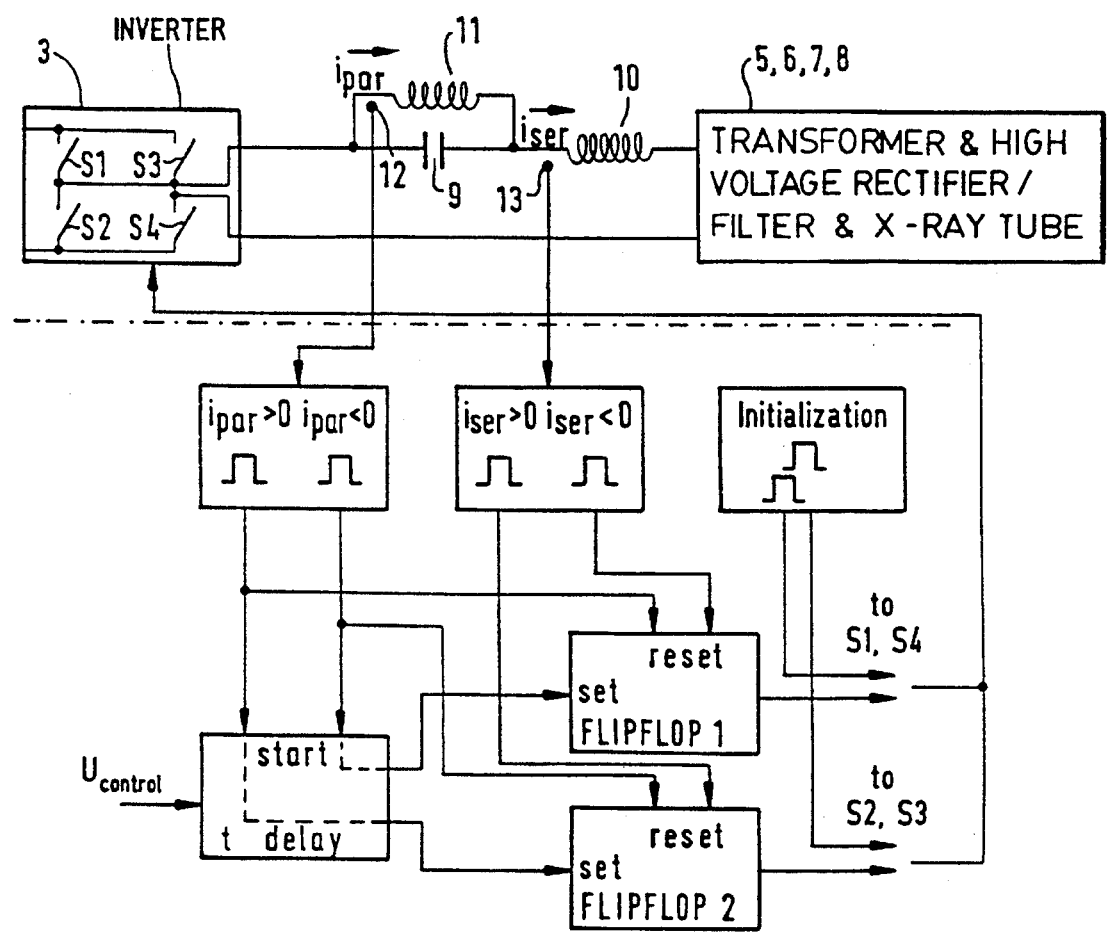
FIG. 2 shows a circuit for driving the inverter in the high-frequency x-ray generator of FIG. 1 in accordance with the principles of the present invention.
Figure 3:
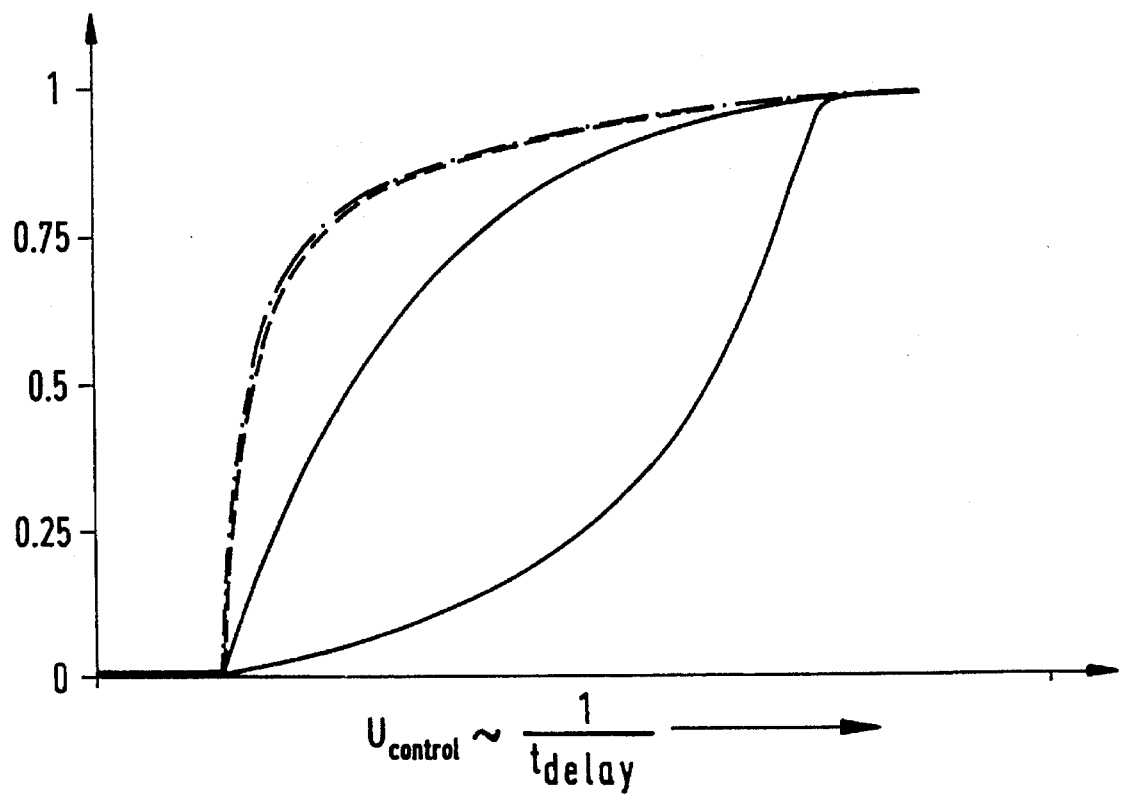
FIG. 3 shows curves for explaining the operation of the circuit of FIG. 2.

First, the current $i_{par}$ in the parallel branch (through the capacitor 9 and the inductance 11) and the current $i_{ser}$ in the series resonant circuit (through the capacitor 9 and the inductance 10) are acquired by sensors 12 and 13 according to FIG. 2 and the zero-axis crossings are identified by the circuit connected thereto. The resonant current amplitude of $i_{ser}$ and, thus, the transmitted power are identified by means of the time delay $t_{delay}$ between the zero-axis crossings of $i_{par}$ and the starting time of $i_{ser}$ (closing of the switches of the inverter 3). The maximum power is reached given $t_{delay}=0$; the power is 0 given $t_{delay} \geq (0.5 \cdot 1/f_{res\text{-}par})$. The control voltage (regulator output signal) is therefore converted into an inversely proportional time delay that defines the turn-on times of the corresponding switch signals. Deactivation is carried out after the end of the oscillation (zero-axis crossing of $i_{ser}$). In order to assure that the inverter 3 remains fully monotonously controllable under all operating conditions (for example, transience extremely low power), deactivation is again carried out no later than at the 0-axis crossing of $i_{par}$. FIG. 3 Shows the transfer characteristic. Two initialization pulses are necessary for starting the arrangement, these activating the current $i_{par}$.

The drive voltage of the inverter 3 is shown on the horizontal axis in FIG. 3, this being inversely proportional to the time delay $t_{delay}$, and the ratio of the input voltage to the output voltage of the inverter 3 for four different load currents is shown on the vertical axis.

The described arrangement adapts automatically to all load instances and to the coupling network. Further, a monotonous control characteristic is achieved. The disadvantages cited above are avoided.

Although modifications and changes may be suggested by those skilled in the art, it is the intention of the inventors to embody within the patent warranted hereon all changes and modifications as reasonably and properly come within the scope of their contribution to the art.

We claim as our invention:

1. A high-frequency generator comprising:

a DC voltage source;

an inverter, having a plurality of switches, connected to said DC voltage source;

a transformer following said inverter and connectable to a load;

an LC series resonant circuit connected between an output of said inverter and said transformer, said LC series resonant circuit containing a first inductance and a capacitance connected in series;

a second inductance connected in parallel with said capacitor and forming a parallel branch;

first sensor means for acquiring a current in said parallel branch, said current exhibiting zero-axis crossings;

second sensor means for acquiring a current in said series resonant circuit, said current exhibiting zero-axis crossings;

means for identifying the zero-axis crossings of each of the current in said parallel branch and the current in said series resonant circuit, the zero-axis crossings for the respective currents exhibiting a time delay therebetween; and means for generating a control signal for switching said switches of said inverse rectifier with a switching time which is inversely proportional to said time delay.

\* \* \* \* \*